United States Patent [19]
Bevilacqua

[11] 3,910,447
[45] Oct. 7, 1975

[54] VESSEL RESTRAINT DEVICE
[75] Inventor: Frank Bevilacqua, Windsor, Conn.
[73] Assignee: Combustion Engineering, Inc., Windsor, Conn.
[22] Filed: Mar. 1, 1974
[21] Appl. No.: 447,187

[52] U.S. Cl............................ 220/3; 176/87
[51] Int. Cl. ............................. F17c 17/12
[58] Field of Search......... 220/3, 66, 69, 71; 176/87

[56] References Cited
UNITED STATES PATENTS
3,578,564  5/1971  Fletcher.............................. 220/3 X
3,744,660  7/1973  Gaines et al...................... 176/87 X Primary Examiner—William I. Price
Assistant Examiner—Steven M. Pollard
Attorney, Agent, or Firm—Robert L. Olson

[57] ABSTRACT

Apparatus for preventing parts of a high pressure nuclear reactor vessel from significantly moving apart if the vessel becomes ruptured or fractured. The apparatus consists of a network of tensioned cables enclosing the vessel, and also a set of cables for preventing the vessel from being dislodged from its support arrangement. The restraining cables are positioned around the reactor vessel in a manner which will permit removal of a hemispherical head portion without having to disassemble the cables.

5 Claims, 3 Drawing Figures

VESSEL RESTRAINT DEVICE

BACKGROUND OF THE INVENTION

In present day nuclear reactor plants used for generating electric power, it is not uncommon to have the vessel housing the fuel core assembly under pressures exceeding 2,500 psi, and temperatures of over 600°F. The greatest of care and quality control is used in fabricating these large vessels, and in testing them, to insure their operability without failure. A large safety factor is also built into the vessel. In spite of these precautions, the possibility may exist, however remote, that a reactor vessel could rupture or fail during operation, for some unforeseen reason. Because of the large pressures contained in the reactor vessel, and the fact that it houses the radioactive fuel core, if a vessel fractured or was moved from its support by release of its internal pressure, the results might lead to significant release of radioactive products into the power plant and the surrounding area.

SUMMARY OF THE INVENTION

The present invention is directed to a network of cables which completely surround a reactor pressure vessel in such a manner that if a rupture or fracture occurs, it would prevent significant movement of large fractured sections of the vessel while allowing the internal pressure of the vessel to be relieved through the fracture or rupture. These cables are positioned and fastened in such a manner that a head portion can be removed without disassembly of the cables. Also a set of cables are provided for holding the vessel firmly on its support structure, so that it will not be dislodged by the large could which would be generated by the release of a high velocity jet of fluid from the vessel through a rupture in the side or bottom of such vessel.

DESCRIPTION OF THE PREFERRED EMBODIMENT

Figure 1:
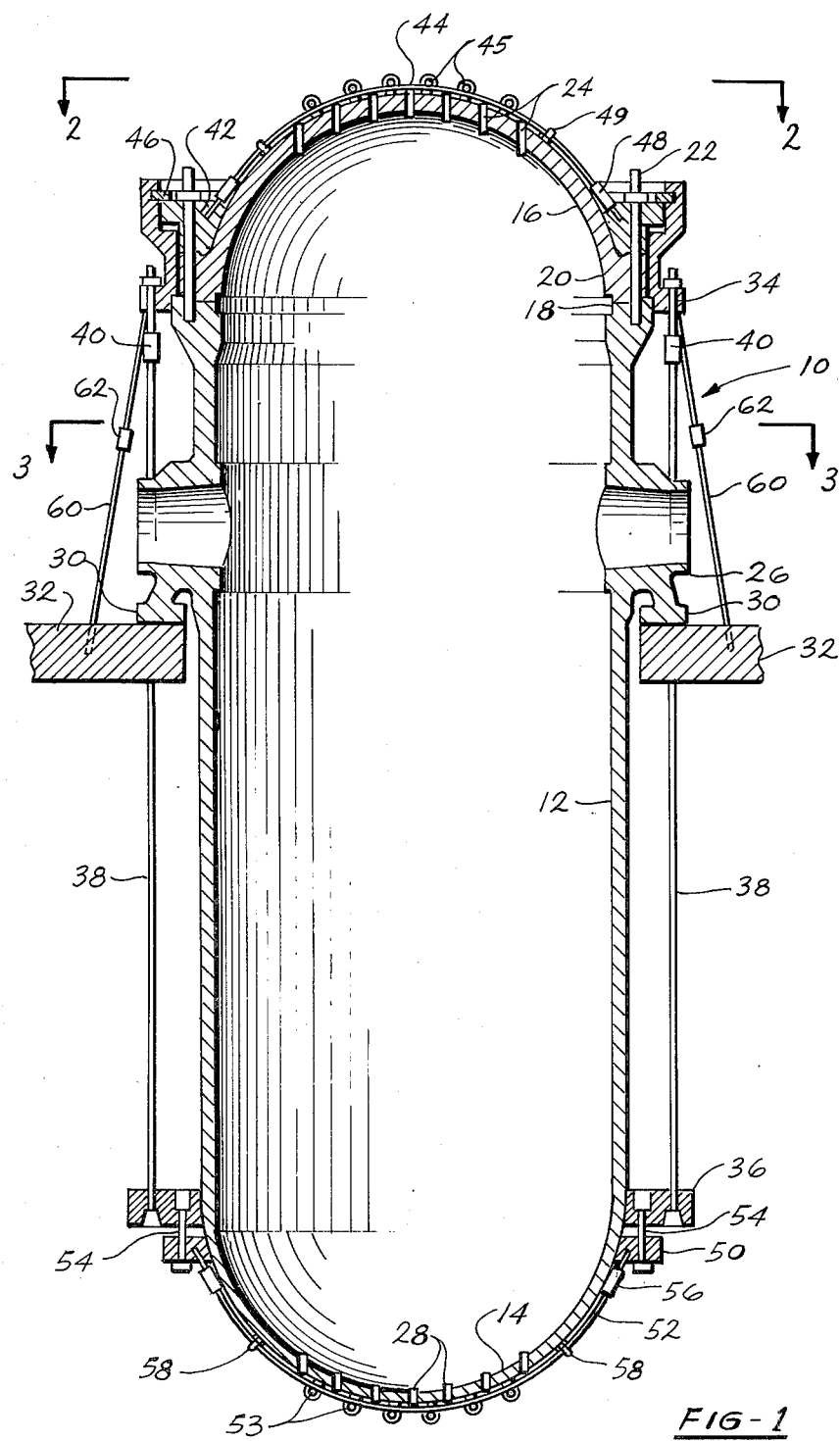
FIG. 1 is an elevational section of a nuclear reactor vessel incorporating the vessel restraint arrangement of the present invention.

Looking now to FIG. 1, a typical nuclear reactor vessel 10 is shown. Vessel 10 has a main cylindrical portion 12, a lower hemispherical portion 14 which is integral with the cylindrical portion 12, and a removable upper hemispherical head portion 16. A plurality of large bolts 22, for example fifty or more, are used for securing the head portion 16 to the main cylindrical portion 12 during operation. Portions 12 and 16 have mating flanges 18 and 20, respectively, at their coacting ends.

Control rod drive nozzle openings 24 are provided in the removable head 16. Similar openings 28 are provided in the bottom 14, for permitting various testing instrumentation to be inserted into the vessel interior. The cylindrical portion of the vessel contains a plurality of large nozzles 26, four being shown (FIG. 3), which permits pipe connections for conveying the fluid heated in vessel 10 to and from heat exchangers (not shown) associated with the reactor vessel. The vessel 10 is supported by means of pads 30 one of which is integral with each of the nozzles 26. These pads rest on structural support members 32.

The vessel restraint apparatus will now be described. A collar 34 surrounds the vessel 10 adjacent the head 16, and rests on flange 18 of the cylindrical portion 12 outside of the head flange 20. Another collar 36 surrounds and engages the vessel at a position adjacent the lower hemispherical portion 14. Extending between these two collars are a plurality of spaced, parallel cables 38. The cables have an enlarged portion at their lower end which seats in appropriate openings in collar 36, and are secured at their upper ends by means of bolts integral with the cable, and coacting nuts. In order to place these cables under the proper tension, turnbuckles 40 are provided on the cables. The four areas just above and below the locations of nozzles 26 are devoid of any cables for obvious reasons.

Figure 2:
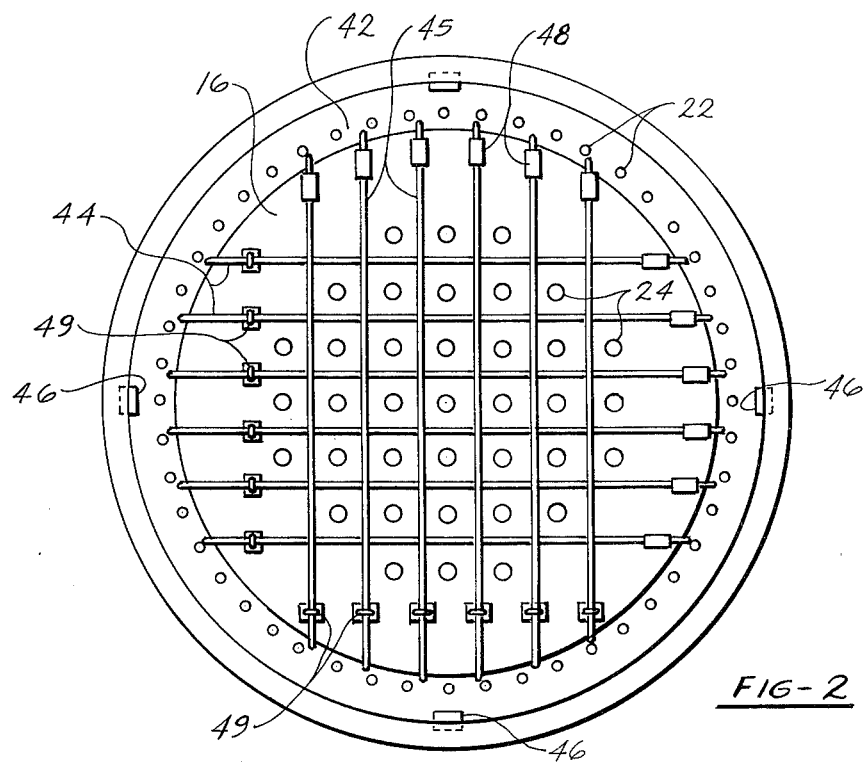
FIG. 2 is a plan view of the arrangement.

A second upper collar 42 surrounds head 16, and is secured to the vessel by the head retaining bolts 22. The upper assembly is additionally secured by a plurality of shear blocks 46. As best seen in FIG. 2, a plurality of parallel, spaced cables 44 extend across the top of the head portion 16. A second set of spaced, parallel cables 45, transverse to the first set, form a checkerboard network on the head 16. All of these cables 44 and 45 contain threaded ends which are secured in suitable openings in collar 42. Welded to the surface of head 16 are a plurality of pads 49 containing eyelets thereon, for maintaining the cables in their proper parallel, spaced, relationship with one another. Each cable has a turnbuckle 48 for proper tensioning. As can be seen in FIG. 1, the head 16 can be removed without the necessity of disassembling any of the cables 38 or the cables 44.

Surrounding the vessel 10 at a position adjacent the lower hemispherical end 14 is a collar 50. This collar 50 is secured to collar 36 by means of nuts and bolts 54. A plurality of spaced, parallel cables 52 extend across the vessel end 14 and are threadably secured to collar 50. Another set of spaced, parallel cables 53 extend transversely of cables 52, forming a checkerboard network, as is the case with the head 16. Pads 58 with eyelets thereon keep the cables in their proper spaced relationship, and turnbuckles 56 allow proper tensioning thereof. Although two lower collars 36 and 50 have been shown and described, one of sufficient size and strength could be used instead. It is desirable to use two individual collars 34 and 42 at the head end of the vessel so that the head 16 can be removed without having to disassemble any of the cables.

Figure 3:
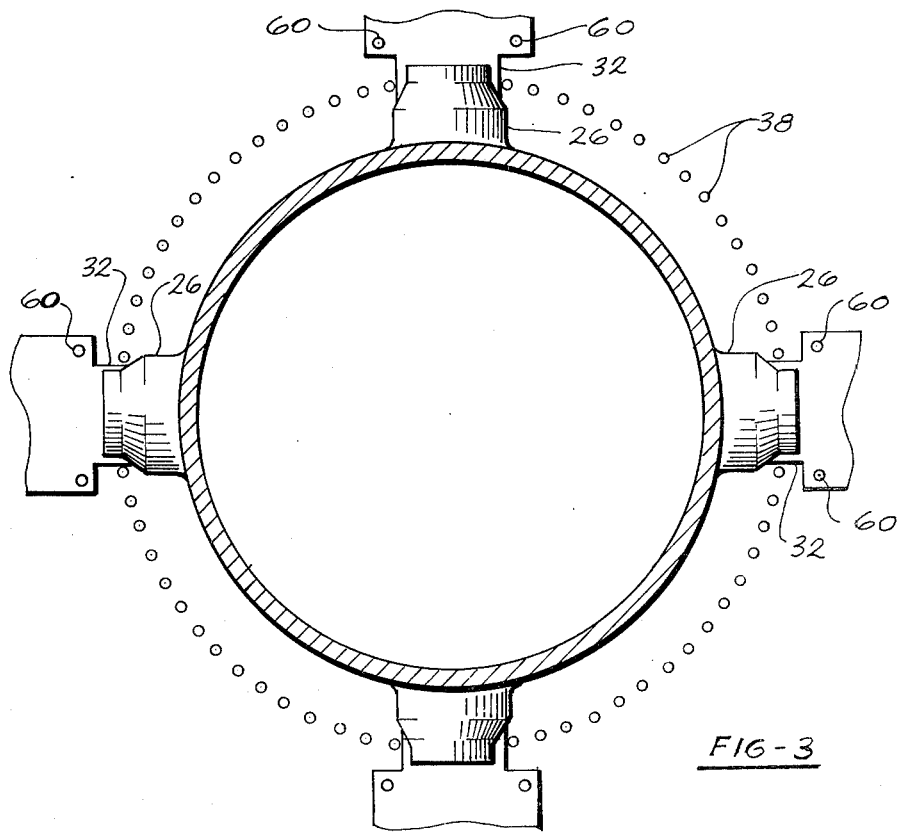
FIG. 3 is a sectional view taken on line 3—3 of FIG. 1.

As best seen in FIGS. 1 and 3, a pair of cables 60 extend between collar 34 and structural supports 32 at each of the locations of the four nozzles 26. These cables 60 can be properly tensioned by turnbuckles 64. In the event of a bottom or side rupture of the vessel, the cables 60 will hold the vessel 10 firmly in place on supports 32 by counteracting any forces created by high velocity jets of fluid escaping from the ruptured vessel.

The cables 38, 44, 45, 52 and 53 form a network of cables which completely surround and enclose the vessel 10. In the highly unlikely event of a rupture or fracture of a reactor vessel, these cables will hold the vessel together, preventing large sections from moving apart which would make the cooling systems ineffective. The cables should be under a predetermined amount of tension when the reactor vessel is at operating temperature, which could be approximately 600°F. Since the temperature and rate of thermal expansion of the metal are known, the cables can be initially set when the vessel is cold, before it is put into operation. After the vessel reaches operating temperature, the tension in the cables can be easily checked by instruments which can be directly attached to a cable, such as a linear variable differential transformer (LVDT). Since the turnbuckles are readily accessible, the cable tension can be adjusted if necessary. The cables should be under tension so that they will be at maximum retaining strength; i.e., so they will not snap in the event of a vessel rupture.

What is claimed is:

1. In combination, a pressure vessel having a main cylindrical portion, a first hemispherical portion integral with and closing one end of the cylindrical portion, a removable second hemispherical portion closing the other end of the cylindrical portion, bolt means for securing the second hemispherical portion to the cylindrical portion, vessel restraint means for preventing the vessel from breaking apart upon rupture thereof, said vessel restraint means including first collar means encircling and engaging the vessel adjacent its first end, second collar means encircling and engaging the vessel adjacent its other end, a first set of a plurality of spaced, parallel cables extending between said first and second collar means, a second set of a plurality of spaced, parallel cables extending across the outer surface of the first hemispherical portion, said second set of cables being secured at both of their ends to the first collar means, and a third set of a plurality of spaced, parallel cables extending across the outer surface of the second hemispherical portion, said third set of cables being secured at both of their ends to the second collar means.

2. The combination set forth in claim 1, wherein all of the first, second, and third sets of cables include tensioning means, so that all of the cables can be placed under a predetermined amount of tension when the pressure vessel is in its normal operating state.

3. The combination set forth in claim 1, including means associated with the outer surfaces of the first and second hemispherical portions for maintaining the second and third sets of cables in their said parallel relationship.

4. The combination set forth in claim 1, wherein the second hemispherical portion has a flange on its open end, the cylindrical portion has a coacting flange, the second collar means comprising two collars, one of which collars engages the second hemispherical portion, the third set of cables secured thereto, and the other collar engages the flange on the cylindrical portion at a location outside of the flange on the second hemispherical portion, the first set of cables extending between said other collar and the first collar means, whereby the second hemispherical portion can be removed from the cylindrical portion without disassembling the first set of cables.

5. The combination set forth in claim 4, wherein the pressure vessel rests on and is supported by structural support means, said structural support means being located beneath the second collar means, and a fourth set of a plurality of spaced cables secured to and extending between the second collar means and the structural support means.

* * * * *

PO-1050
(5/69)

UNITED STATES PATENT OFFICE
CERTIFICATE OF CORRECTION

Patent No. 3,910,447        Dated October 7, 1975

Inventor(s) Frank Bevilacqua

It is certified that error appears in the above-identified patent and that said Letters Patent are hereby corrected as shown below:

Column 1, line 34, after "large" insert --forces; change "could which" to --which could--; delete "would"

Signed and Sealed this eleventh Day of May 1976

[SEAL]

Attest:

RUTH C. MASON
Attesting Officer

C. MARSHALL DANN
Commissioner of Patents and Trademarks